Dec. 24, 1963  C. C. QUICK, JR  3,115,350
VEHICLE CHASSIS
Filed Nov. 17, 1961  2 Sheets-Sheet 1
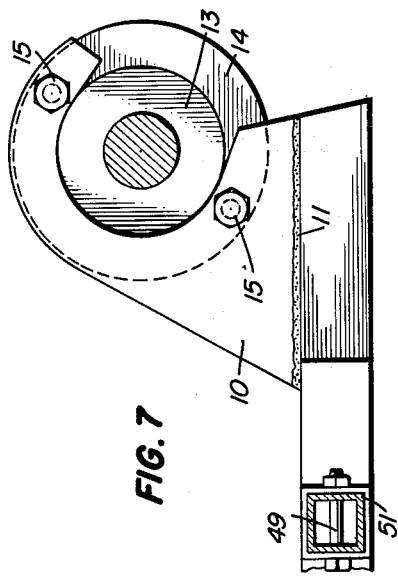
FIG. 7
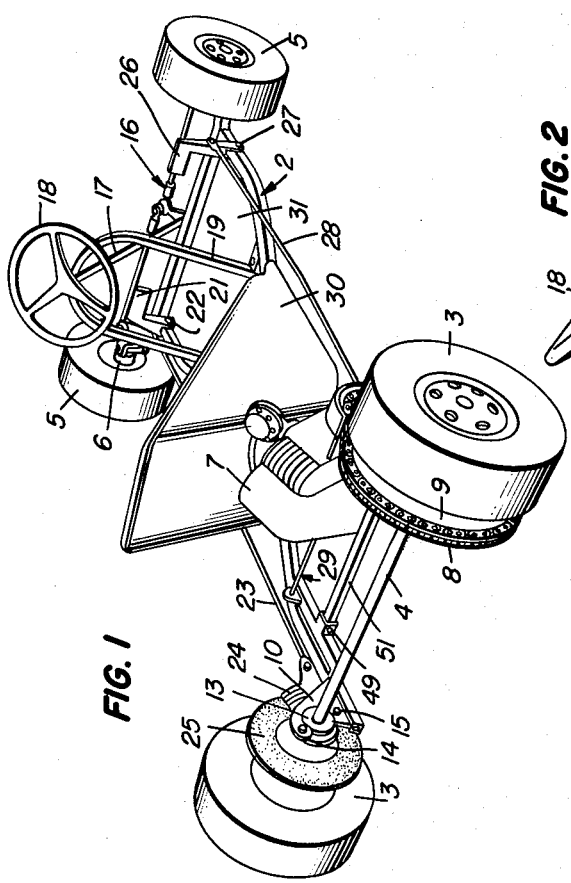
FIG. 1
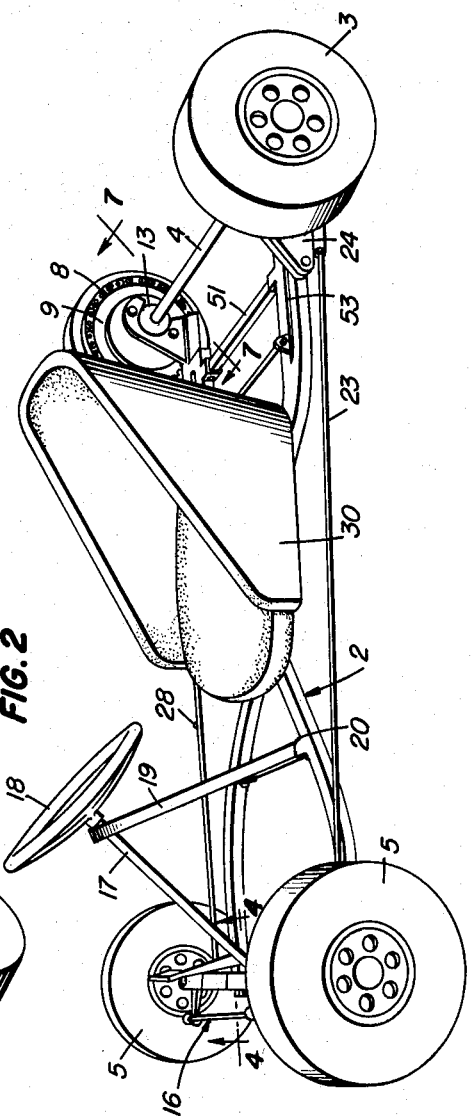
FIG. 2
INVENTOR.
Clarence C. Quick, Jr.
BY 
ATTORNEY Dec. 24, 1963 C. C. QUICK, JR 3,115,350
VEHICLE CHASSIS
Filed Nov. 17, 1961 2 Sheets-Sheet 2
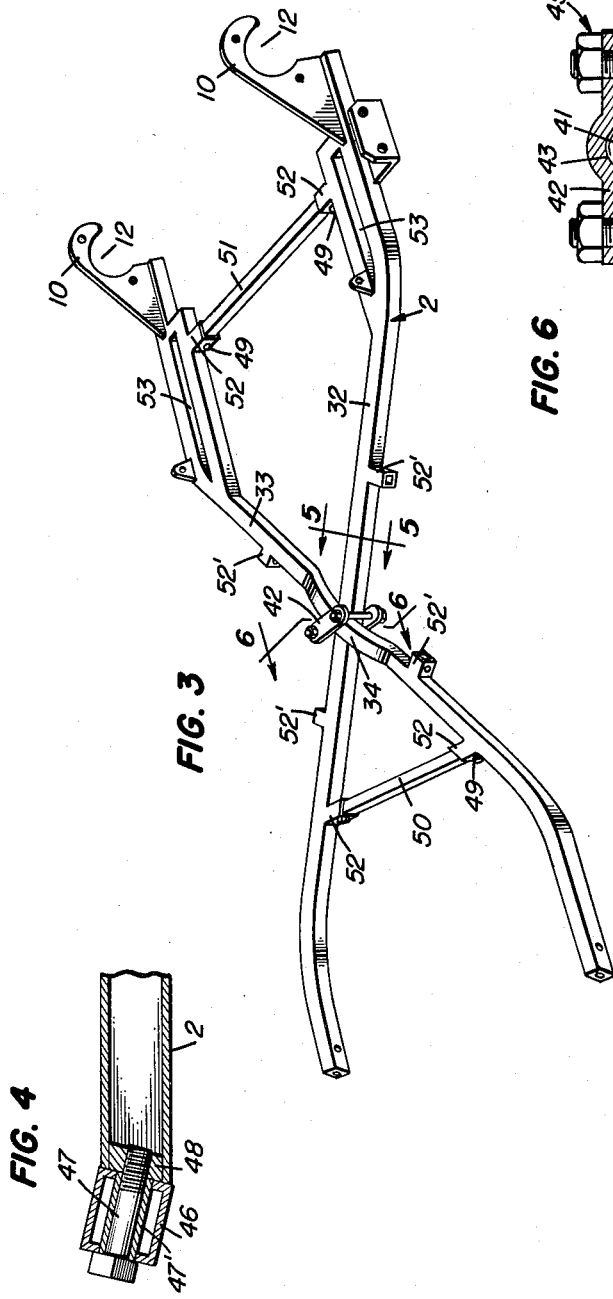
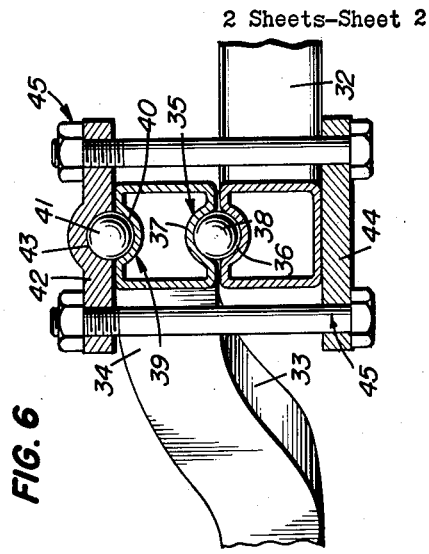
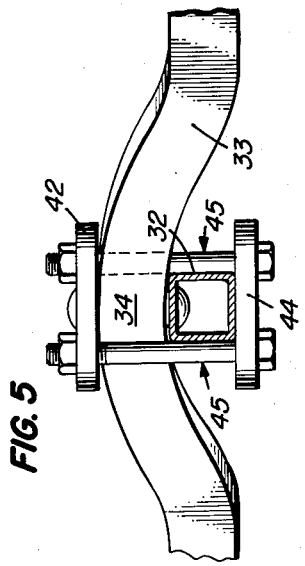
INVENTOR.
Clarence C. Quick, Jr.
BY
ATTORNEY United States Patent Office 3,115,350
Patented Dec. 24, 1963

3,115,350
VEHICLE CHASSIS
Clarence C. Quick, Jr., Rte. 2, Ruston, La.
Filed Nov. 17, 1961, Ser. No. 153,184
9 Claims. (Cl. 280—106)

This invention relates to a vehicle chassis, and more particularly to a non-rigid chassis for miniature racing motor vehicles such as racing "karts."

Conventional race tracks for automotive vehicles usually have tight turns which must be negotiated at high speeds, and racing vehicles of relatively light weight, such as "karts," which are fast and powerful, have no road-holding ability when driven at high speeds through tight turns. As a consequence, the vehicle wheels spin when coming out of a turn, and continue to spin for an appreciable distance on the straight-away; hence, much needed power is expended in the form of rubber dust rather than in producing a forward thrust to the vehicle.

An object of the invention is to provide an improved vehicle chassis, particularly for racing vehicles, constructed and arranged whereby the wheels are maintained in ground-engaging position at all racing speeds and around tight turns of various types.

Another object of the invention is to provide an improved non-rigid vehicle chassis employing separate, relatively movable crossed frame members.

Yet another object of the invention is to provide an improved non-rigid vehicle chassis employing a pair of frame members arranged in crossed relation and pivotally connected at the crossover, whereby each of the frame members is movable independently of the other about the crossover as a fulcrum point.

Still another object of the invention is to provide an improved non-rigid vehicle chassis having a pair of crossed frame members incorporating a ball joint at the crossover point, whereby each of the frame members is movable with respect to the other about the ball joint as a fulcrum point.

A still further object of the invention is to provide an improved non-rigid vehicle chassis employing separate, relatively movable crossed frame members incorporating a pair of clamping plates and a double ball joint at the crossover point of the crossed frame members.

A still further object of the invention is to provide an improved non-rigid vehicle chassis employing separate relatively movable crossed frame members wherein the upper frame member is offset at the crossover point, and wherein a first ball is seated between a top clamping plate and the offset portion of the upper frame member and a second ball is seated between the lower surface of the upper frame member and the upper surface of the lower frame member.

Another object of the invention is to provide an improved non-rigid vehicle chassis employing separate, relatively movable crossed frame members wherein an upper clamping plate is formed with a semi-spherical-shaped recess to provide a seat for a first ball and retain it in contact with the offset portion of the upper frame member, and a bottom clamping plate is secured flush against the bottom surface of the lower frame member.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful application to the particular constructions which, for the purpose of explanation, have been made the subject of illustration.

In the drawings:

FIGURE 1 is a perspective view of a racing "kart";

FIG. 2 is a perspective view of the racing "kart" shown in FIG. 1, with the engine removed;

FIG. 3 is a perspective view of the improved non-rigid chassis frame;

FIG. 4 is a sectional view taken along line 4—4 of FIG. 2;

FIG. 5 is a sectional view taken along line 5—5 of FIG. 3;

FIG. 6 is a sectional view taken along line 6—6 of FIG. 3; and

FIG. 7 is a sectional view taken along line 7—7 of FIG. 2.

Referring to the drawings, and more particularly to FIGS. 1 and 2, the improved racing "kart," designated generally by numeral 1, comprises a chassis frame 2, to be described more fully hereinafter, and rear wheels 3 secured to a drive axle 4 rotatably mounted on the chassis frame through suitable bearings, and front wheels 5 rotatably mounted on the vehicle chassis through a conventional yoke-type front wheel suspension 6. An internal combustion engine 7, mounted on the rear portion of the vehicle chassis, is adapted to drive the rear wheels 3 by means of a chain 8, and a sprocket wheel 9 secured to the drive axle. The rear portion of the chassis frame is provided with a pair of upwardly extending brackets 10, FIGS. 1, 3 and 7, rigidly secured thereto by welding as at 11, or by other suitable means, each of the brackets having an arcuate-shaped opening 12, adapted to receive a bearing 13 in which one end of the drive axle 4 is journaled, the bearing being positioned within the opening 12 and secured to the bracket 10 by means of a collar 14 fitted around the bearing and secured to the bracket by bolts 15, as shown in FIGS. 1 and 7.

The "kart" 1 is also provided with a suitable steering linkage 16 connected to the front wheels and to a steering column 17, having a steering wheel 18, the steering column being supported by a forwardly inclined, inverted U-shaped frame 19 secured to the chassis frame as at 20. A brake pedal 21 (FIG. 1) is pivotally mounted on the chassis frame as at 22, the pedal being connected to one end of a brake rod 23, extending rearwardly of the vehicle and operatively connected to a brake shoe 24, adapted for engagement with a brake disc 25 carried by the drive axle. An accelerator pedal 26 is pivotally mounted on the opposite side of the chassis frame as at 27, said pedal being connected to one end of a rod 28, extending rearwardly of the vehicle and operatively connected to the throttle of the internal combustion engine 7, through a suitable linkage 29. The "kart" is further provided with a seat 30 and, if desired, a floor 31 may be secured to the forward portion of the chassis frame.

As noted hereinbefore, one of the most important features of the present invention is the construction and arrangement of the "kart" chassis frame, comprising a pair of frame members positioned in crossover relation and pivotally connected at the crossover, whereby each of the members is movable independently of the other about the crossover as a fulcrum point. Reference being had to FIGS. 3, 5 and 6, the non-rigid chassis frame 2 comprises a first frame member 32, and a second frame member 33 having an offset portion 34; said frame members being arranged in crossed relation to form an X-frame, the offset portion 34 of the second frame member being at the crossover point. A first ball joint 35 at the crossover point comprises a recess 36 formed in the upper surface of frame member 32, said recess cooperating with a complementary recess 37 formed in the lower surface of the frame member 33, thereby forming a spherical socket for a ball 38 positioned between the frame members. A second ball joint 39 comprises a recess 40 formed in the upper surface of frame member 33 in which a ball 41 is retained by means of a plate 42 formed with a complementary recess 43; said frame members 32 and 33 being pivotally secured at the crossover point through the ball joints 35 and 39 by means of a plate 44 mounted flush with the lower surface of frame member 32 and having bolt means 45 extending therefrom to the plate 42, whereby the frame members 32 and 33 can move independently of each other about the crossover as a fulcrum point.

In order for the chassis 2 to function properly, every part thereof must be able to move in a vertical plane. Accordingly, the front axle supporting member 46 is mounted on the forward ends of the frame by means of bolts 47 (FIG. 4) extending through a bushing 47' and threadable into the plugs 48 secured to the inner walls of the frame members 32 and 33 so as to permit the axle supporting member to pivot at these points. The mounting for the rear axle bearing is rigid with respect to the chassis but does not interfer with its vertical movement.

The seat 30 is mounted on the sockets 52' and the steering post support is secured to the crossbar 50, which mountings are flexible, that is to say they are free to move in a vertical plane; in other words, the construction is such that nothing interferes with the vertical movement of the chassis members.

As will be seen in FIGS. 1, 2, 3 and 7 the bolts 49, used to secure the ends of the crossbars 50 and 51 within the sockets 52, carried by the frame members, are positioned in a plane parallel to the longitudinal axis of the chassis to thereby form pivotal connections between the frame members and the cross bars. This is an important feature of the assembly, and is essential in connection with the maintenance of a non-rigid chassis employing separate but relatively movable cross members. It will be noted (FIG. 3) that the rear portion of the chassis frame 2 is slotted as at 53 to receive bolts or other suitable fastening means, not shown, for mounting the engine 7 and other components of the "kart" thereon.

With reference to the pivotal action of the chassis frame, it will be observed that any upward thrust, exerted in the vicinity of an end portion of either of the chassis members at the front or rear of the "kart," will be transmitted diagonally of the member about the crossover as a fulcrum point, thus applying a downward force on the opposite end of the member. Similarly, upward thrusts at the ends of the chassis members, front or rear, will be transmitted to the corresponding end portions of the chassis. This pivotal action about the cross-over point of the chassis members as a fulcrum enable the "kart" to utilize substantially full power with minimum spinning of the wheels in negotiating relatively tight turns, and on the straight-aways. In this connection, the forces tending to cause the "kart" to tilt, when negotiating a tight turn at high speeds, thus decreasing adhesion between the wheels and the track surface, are balanced out due to the pivotal action of the chassis members about the fulcrum point.

It will be observed upon examination of the improved chassis frame that it is of the lever type, and transfers the load diagonally without restriction. While the crossover point is shown at substantially the center of the frame members, it will be understood that the lengths of the moment arms of the levers may be varied to provide any desired ratio of load transfer. Additionally, it is to be particularly noted that the load remains on both chassis members regardless of the load shift which is in sharp contradistinction to the conventional rigid chassis, wherein a shift in the load will cause a larger percentage of the load to be present on only one of the chassis members. It has been further found that the vibration factor of the chassis of the present invention is practically nil.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A non-rigid vehicle frame, comprising a first frame member and a second frame member, said second frame member being arranged in crossover relation with respect to said first frame member and forming therewith an X-frame, running gear for the vehicle, including front and rear axles having pairs of wheels associated therewith, the front axle being connected to the ends of the portions of the frame members at one side of the crossover, the rear axle being connected to the end portions of the frame at the opposite side of the crossover, means for pivotally connecting the frame members at the crossover, including a ball positioned between the lower surface of the second frame member and the upper surface of the first frame, whereby the frame members are movable independently of each other about the ball as a fulcrum point.

2. A non-rigid vehicle frame according to claim 1, wherein clamp means are secured to said members at the crossover point for retaining the ball between the frame members.

3. A non-rigid vehicle chassis frame, comprising a first frame member and a second frame member, said second frame member being arranged in crossover relation with respect to said first frame member and forming therein an X-frame, the second frame member having an offset portion at the crossover point of the frame members, the upper surface of the first frame member at the crossover having a recess formed therein, the lower surface of the second frame member having a complementary recess formed therein, a first ball seated in said recesses, the upper surface of the second frame member having a recess formed therein, a second ball seated in said recess, and clamping means secured to the frame members at their point of crossover, whereby the frame members are movable independently of each other about the ball joints as fulcrum points.

4. A non-rigid vehicle chassis frame according to claim 3, wherein the clamping means comprises a first plate adjacent the lower surface of the first frame member, a second plate having a semi-spherical-shaped recess providing a seat for the second ball, and bolt means for clamping the plates in seated position at the crossover point of the frame members.

5. A "kart" of the character described, comprising a chassis frame having a pair of frame members arranged in crossed relation; running gear for the "kart," including front and rear axles having pairs of wheels associated therewith, a front axle supporting member secured to the ends of the portions of the frame members defining an acute angle at one side of the crossover, the rear axle being rotatably supported on the end portions of the frame at the opposite side of the crossover, a first transverse bar having its ends pivotally connected to the frame portions intermediate the front axle supporting member and the crossover, and a second transverse bar having its ends pivotally connected to the frame portions intermediate the rear axle and the crossover, the chassis frame members being pivotally connected at the crossover point, whereby each of said members is movable independently of the other about the crossover as a fulcrum point.

6. A "kart" in accordance with claim 5, wherein the front axle supporting member and the transverse bars are secured to the frame portions by bolt means having their longitudinal axes lying in a plane parallel to the longitudinal axis of the chassis frame.

7. A "kart" in accordance with claim 5, wherein the ends of the transverse bars are seated with a loose fit in socket members carried by the frame portions.

8. A "kart" in accordance with claim 5, wherein the rear axle is supported on the chassis frame by means of a pair of brackets secured thereto, each of the brackets having an arcuate-shaped opening formed therein, a bearing seated in each opening adapted to receive an end of the rear axle, and means carried by each bracket for retaining the bearing in the opening.

9. A non-rigid vehicle chassis frame, comprising a first frame member and a second frame member, said frame members being arranged in crossover relation thereby forming an X-frame, running gear for the vehicle, including front and rear axles having pairs of wheels associated therewith, the front axle being connected to the ends of the portions of the frame members at one side of the crossover, the rear axle being connected to the end portions of the frame at the opposite side of the crossover, ball joint means pivotally connecting the frame members at the crossover, said ball joint including a recess formed in each of the frame members, said recesses cooperating to form a socket, and a ball positioned within said socket, whereby each of the members is movable in a vertical plane independently of the other about the crossover as a fulcrum point to thereby transmit a force exerted on one end of either of the frame members in a direction diagonally of the X-frame, thus applying an equal and opposite force on the opposite end of the member.

References Cited in the file of this patent

UNITED STATES PATENTS

| | | |
|---|---|---|
| 706,534 | Dawson | Aug. 12, 1902 |
| 894,000 | Hart et al. | July 21, 1908 |
| 1,785,118 | Fry | Dec. 16, 1930 |